United States Patent [19]
Leonard

[11] 3,895,556
[45] *July 22, 1975

[54] CHORD PATTERN ANALYSER

[76] Inventor: Verna M. Leonard, 8701 Highway 41, Fresno, Calif. 93721

[*] Notice: The portion of the term of this patent subsequent to Apr. 24, 1990, has been disclaimed.

[22] Filed: Feb. 22, 1974

[21] Appl. No.: 444,895

[52] U.S. Cl. .............................. 84/471; 235/89 R
[51] Int. Cl. ............................................ G09b 15/02
[58] Field of Search ............................ 84/470–485; 235/83–85, 89

[56] References Cited
UNITED STATES PATENTS

| | | | |
|---|---|---|---|
| 336,595 | 2/1886 | Rosecrans | 84/473 |
| 375,496 | 12/1887 | Mason | 84/480 |
| 2,938,421 | 5/1960 | Leonard | 84/473 X |
| 3,728,931 | 4/1973 | Leonard | 84/471 |
| 3,791,254 | 2/1974 | Müller | 84/471 |

Primary Examiner—Lawrence R. Franklin
Attorney, Agent, or Firm—Ralph S. Branscomb

[57] ABSTRACT

A device for use by a student of music in demonstrating the make-up or patterns of the various chords and the underlying relationship of the tones as demanded by the inflexible interval relationship of the tones in the major, minor, diminished, augmented chords and certain polychords, for each key signature, the device having a comprehensive chart wherein the key signatures with scale tones of the different key signatures are plotted against or in relation to the scale degrees, and selectively exposed strips with the specific chords represented thereon as tones in a particular spatial relationship are disposed in alignment with different columns with indicators for raising or lowering the scale tone, half-tone, in the above-mentioned chart, so that the user can see at a glance the composition or structure of any chord. A plurality of dials having arrays of write-in boxes are stacked in an envelope portion of the device so that the student-user may write in names of the tones in each chord as a learning exercise and so that these dials may be referred to subsequently by the student-user.

5 Claims, 5 Drawing Figures

CHORD PATTERN ANALYSER

BACKGROUND OF THE INVENTION

Many devices and charts have been produced to show the scale tones for specified key signatures and of course the relationships represented therein are those generally recognized and notoriously old in the field of music. Dials capable of being adjusted to display music information are not new per se. However, the prior art apparently does not include a device which brings together means for showing at a glance all the various key signatures in full and related to the corresponding scale tones and simultaneously relating this information to the various chords. There is a need for such a device.

SUMMARY OF THE INVENTION

As claimed, the disclosed device satisfies the immediately above-mentioned need and comprises a panel displaying a chart with key signatures, and named scale tones, plotted against scale degrees, with means to point out the components of the various chords by indicating the columns in the chart or scale degrees and the necessary half-tone raising and lowering thereof to obtain not only major chords but also augmented, diminished, minor and certain polychords, the device also including a dial or a set of dials which have writing spaces thereon for the user to record information gained by employment of the device, thus reinforcing the learning process.

DETAILED DESCRIPTION OF A PREFERRED EMBODIMENT

Figure 1:
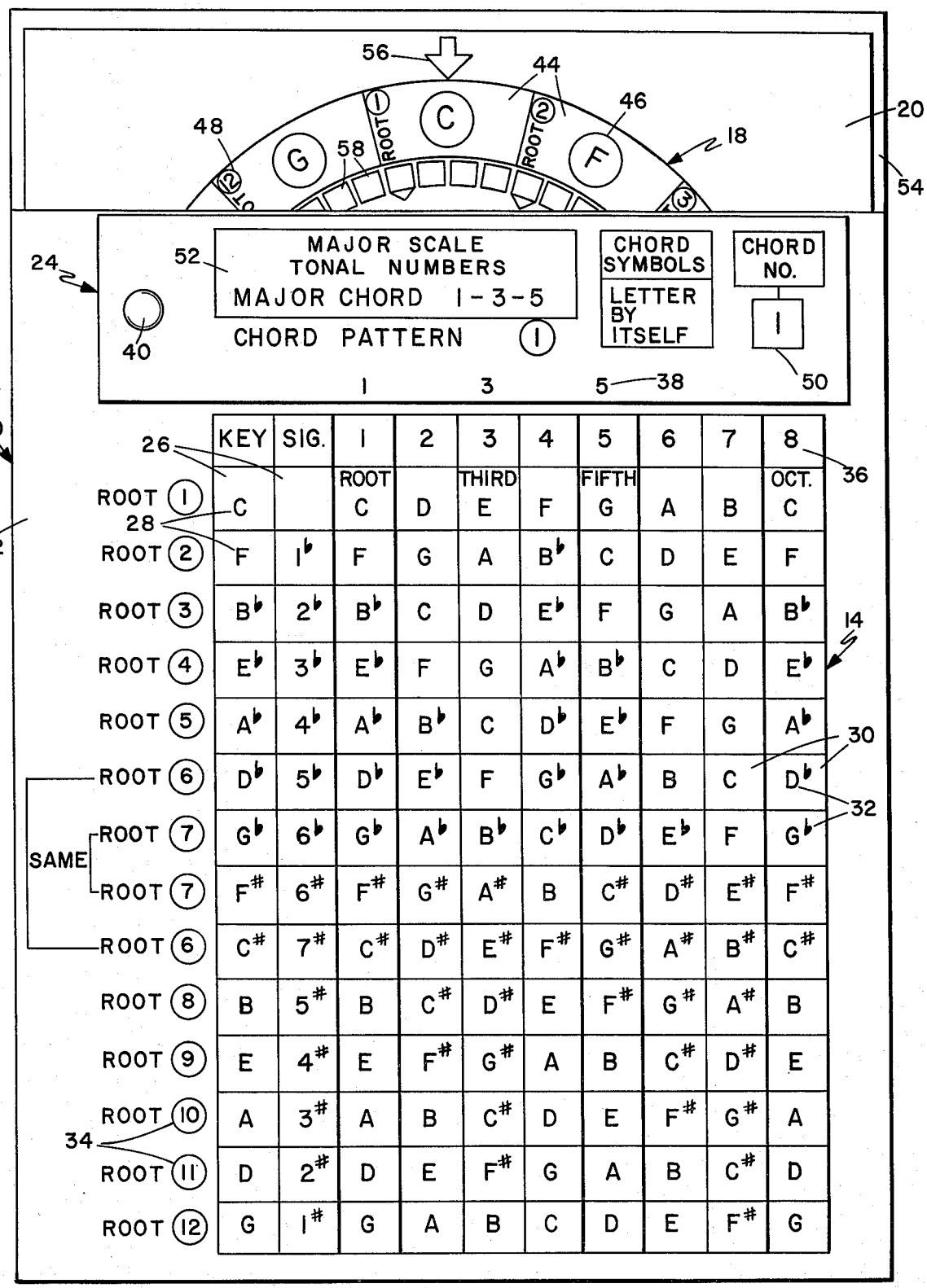
FIG. 1 is a front elevational view of the chord pattern analyser.
Figure 2:
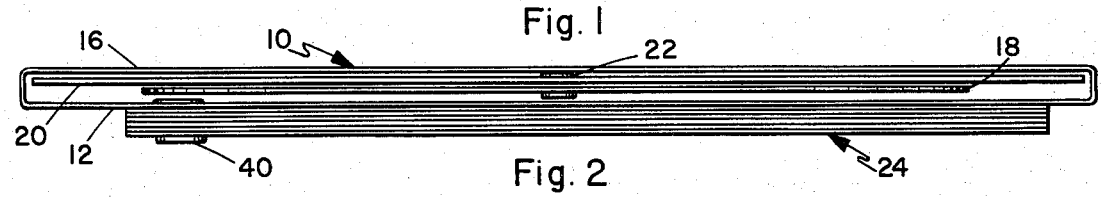
FIG. 2 is a top plan view of the same.
Figure 5:
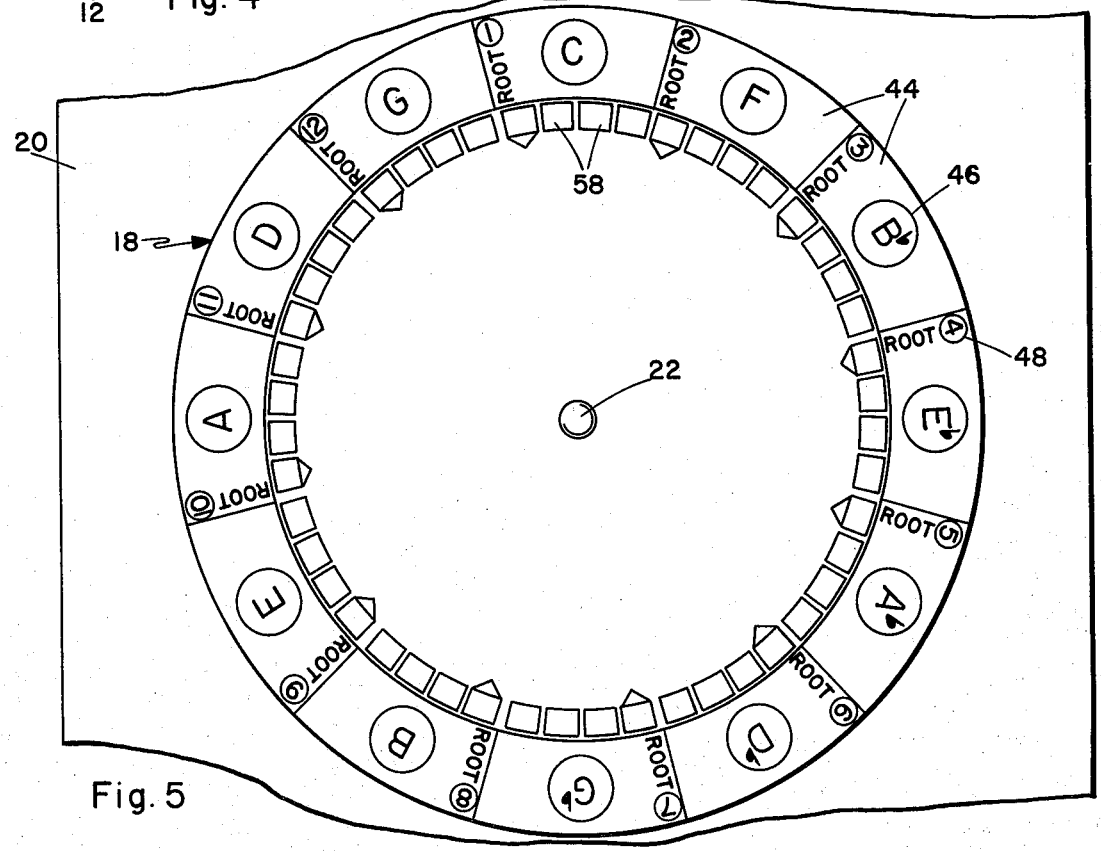
FIG. 5 is an elevational view of the dial and a portion of the rear panel, the structure in the foreground being omitted to expose the complete dial.

As illustrated, this invention comprises a support, generally indicated by the numeral 10, and which may be thought of as being envelope-like in that it has a front panel 12 having a chart 14 printed or otherwise applied thereto, and a rear panel 16, thereby defining a pocket for at least one dial 18. As best illustrated in FIGS. 1 and 5 this dial 18 is preferably supported on a separate panel 20 which may be a simple rectangular sheet of paper, for rotative adjustment about a pivot pin 22. The more mechanical elements of the item also include a plurality of strips 24, selectively exposable in critical positional relationship with the chart 14.

More specifically, the chart 14 has columns 26 wherein key signature 28 are shown, preferably both as by key name as well as by the number of sharps or flats in each key, and parallel columns 30 for the corresponding scales 32. These key signatures and corresponding scale tones are thus arranged in parallel lines and as illustrated are twelve in number and arbitrarily numerically identified as at 34. The columns 30, at least eight in number, as illustrated, or extended to two octaves for showing polychords, are identified by the numerical sequence indicated at 36 so that the scale degrees, particularly the root, third and fifth, are identified for each key signature.

The strips 24 are selectively disposable along one edge of the chart 14 and these strips each have imprinted thereon or otherwise applied thereto indicator means which may be the simple numerical indicators 1–3–5 identified by the reference numeral 38, to identify the root, third and fifth of columns 30 pointed out. The criticality of placement of the strips will of course be obvious and the illustrated means to secure this necessary registration of the numerical indicators 38 with the proper columns is to pivotally attach all the strips to the support 10, as by a pivot pin 40, to an upwardly extended portion of the front panel 12.

Figure 3:
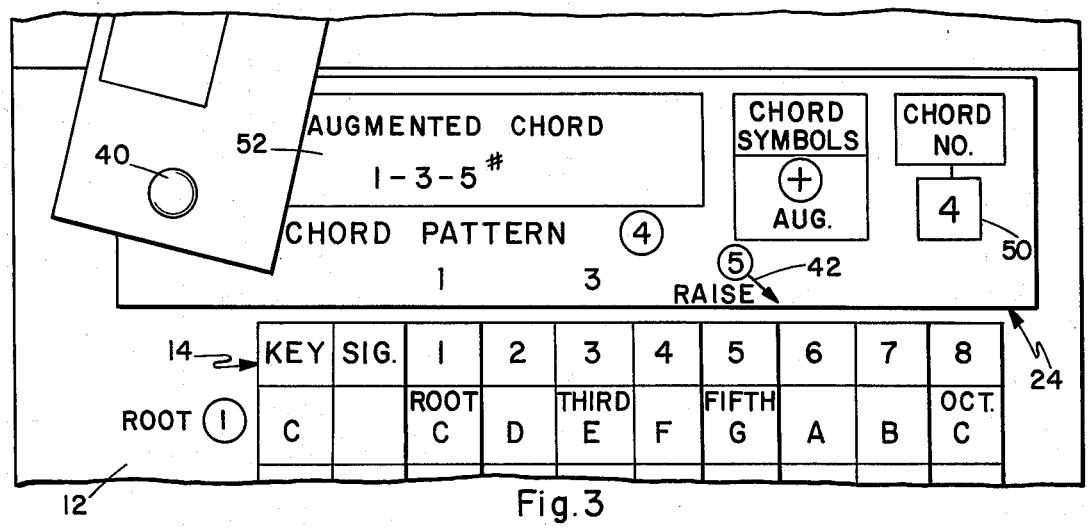
FIG. 3 is a fragmentary front elevational view showing a different one of the strips exposed in operative position.
Figure 4:
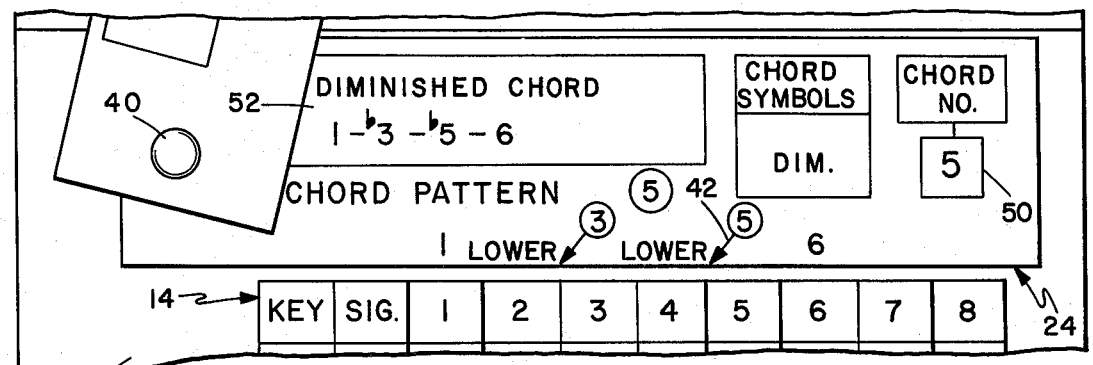
FIG. 4 is a view similar to FIG. 3 with a still further one of the strips in exposed, operative position.

In use, one strip 24 at a time is exposed in marginal relationship with the chart 14 and each strip carries the indicators 38 which, as illustrated in FIGS. 3 and 4, include means 42 illustrated as arrows, to direct the sharping or flatting of the corresponding tones in the columns 30. For example, in the strip exposed in FIG. 3 the fifth is directed to be raised a half-tone to produce the augmented major chords for every key signature shown in the chart. Similarly the strip exposed in FIG. 4 directs the lowering of the third and fifth to achieve the diminished chord, in this case with the sixth added according to musical custom. It will be obvious that the student-user of this chord analyser will obtain ready and completely reliable instruction of musical theory and practice, the reinforcement stemming particularly from the fact that all the common chords for all the indicated key signatures are demonstrated as being uniformly and simply achieved.

The instructional function of the analyser is supplemented by provision of the dials 18 which may be stacked in the pocket defined between the front and rear panels 12 and 16. These dials may be loosely held in said pocket and simply raised one at a time to display a segment thereof above the front panel 12, and alternatively, as illustrated, the dials 18 are rotatably attached to individual panels 20 by pivot pins 22 and these panels may be simple sheets of paper insertable, with the dials attached thereto, into said pocket. In any case, each dial is divided into segments 44 identified by the key signature indicia 46 and numerical indicators 48 corresponding with the arbitrary numbering 34 on the chart, to facilitate the relating of the particular chords. This same numbering is also applied to the strips 24 as indicated at 50 and of course the chords are clearly named on each strip as indicated at 52. As illustrated in FIG. 1 the rear panel 16 is preferably upwardly extended as at 54 and an indicator such as the arrow 56 on the extended portion 54 is used to point out the particular segment of the dial being used. A plurality of write-in boxes 58 are provided in each segment 44 of the dial and the student-user may write in the names of the scale tones in the particular chords, as a learning exercise and also for future reference.

I claim:

1. A chord analyser, comprising:
    a support including a display chart panel with tabulated indicia in columns therein plotting the scale tones for the different key signatures in relation to the scale degrees;
    a plurality of strips selectively mountable on said base in conjunction with said indicia plotting the scale degrees;

said strips having thereon means to point out particular combinations of columns with half-tone raising and lowering indicators for particular chords enabling the reading of the chart to determine the scale tones for said particular chords in the different key signatures.

2. A chord analyser according to claim 1 wherein said strips extend the entire width of said tabulated indicia columns and are pivotally secured at one common end to an upper portion of said support in a stack so that the strips can be individually manually swung normal to and above the columns.

3. A chord analyser according to claim 1 wherein said strips have means thereon to direct the sharping and flatting of certain degrees to obtain minor, diminished and augmented chords and polychords.

4. A chord analyser according to claim 1 and including a dial rotatively adjustably mounted on said support with a limited portion thereof visible and the remainder hidden behind said display chart panel;

said dial having a plurality of segments each having a key signature and an array of writing space boxes, said limited portion encompassing at least one of said key signatures and an array of writing space boxes;

whereby a student-user of the chord pattern analyser may write in the names of the scale tones for the different chords as a learning exercise and for subsequent reference.

5. A chord analyser according to claim 4 wherein said dial is one of a set of such dials so that said learning exercise can be extended to analysing and writing in all the chords including the major, minor, diminished and augmented chords and polychords, and said base has a pocket dimensioned to receive all said dials.

* * * * *